(12) United States Patent
Volovec

(10) Patent No.: US 9,121,510 B2
(45) Date of Patent: Sep. 1, 2015

(54) PRESSURE INDEPENDENT CONTROL VALVE

(75) Inventor: Peter Volovec, Kapele (SI)

(73) Assignee: TA HYDRONICS S.A., Eysins (CH)

( * ) Notice: Subject to any disclaimer, the term of this patent is extended or adjusted under 35 U.S.C. 154(b) by 70 days.

(21) Appl. No.: 13/255,404

(22) PCT Filed: May 5, 2010

(86) PCT No.: PCT/IB2010/001372
§ 371 (c)(1),
(2), (4) Date: Nov. 14, 2011

(87) PCT Pub. No.: WO2010/103408
PCT Pub. Date: Sep. 16, 2010

(65) Prior Publication Data
US 2012/0043487 A1 Feb. 23, 2012

(30) Foreign Application Priority Data

Mar. 9, 2009 (EP) .................................... 09003416

(51) Int. Cl.
*F16K 31/524* (2006.01)
*F16K 1/12* (2006.01)
*G05D 16/10* (2006.01)

(52) U.S. Cl.
CPC .............. *F16K 1/126* (2013.01); *G05D 16/106* (2013.01); *Y10T 137/3367* (2015.04)

(58) Field of Classification Search
CPC ........... F16K 1/12; F16K 1/126; F16K 3/186; G05D 16/106; Y10T 137/3367
USPC .......... 137/219, 614.2, 614.21, 613; 251/210, 251/211, 212
See application file for complete search history.

(56) References Cited

U.S. PATENT DOCUMENTS 3,102,550 A 9/1963 Shand et al.

FOREIGN PATENT DOCUMENTS

| EP | 0584968 A1 | 3/1994 |
|---|---|---|
| EP | WO 01/66984 A2 | 9/2001 |
| FR | 1490208 | 7/1967 |

OTHER PUBLICATIONS

Machine translation, Gas pressure regulator, Fisher Governor Co. FR 1490208. Jul. 28, 1967.*

(Continued)

*Primary Examiner* — John K Fristoe, Jr.
*Assistant Examiner* — Kevin Barss
(74) *Attorney, Agent, or Firm* — Heslin Rothenberg Farley & Mesiti P.C.; Victor A. Cardona, Esq.

(57) ABSTRACT

A control valve includes a wall defining a chamber having an inlet end, a middle portion and an outlet end in axial alignment. A valve seat and a valve plug are proportioned to fit the valve seat arranged in axial alignment within the chamber. At least one of the valve seat and valve plug is configured for axial movement towards the other. Relative movement between the valve plug and valve seat is enabled by a cam mechanism including a first shaft assembly extending axially along the chamber and fixed to one of the valve plug and valve seat. A cam is operable with the first shaft assembly to separate or draw together the valve seat and valve plug along the axis of the chamber. A second shaft assembly is coupled to the cam and extends through the middle portion of the chamber wall terminating in a free end attachable to a rotary actuator.

14 Claims, 2 Drawing Sheets

(56) References Cited

OTHER PUBLICATIONS

International Search Report and Written Opinion completed on Nov. 18, 2010, for corresponding PCT International Application No. PCT/IB2010/001372 filed on May 5, 2010, and mailed on Nov. 25, 2010.

PCT/IB/373 International Preliminary Report on Patentability, issued Sep. 13, 2011, with Written Opinion completed on Nov. 18, 2010, for corresponding PCT International Application No. PCT/IB2010/001372 filed on May 5, 2010.

* cited by examiner

PRESSURE INDEPENDENT CONTROL VALVE

CROSS REFERENCE TO RELATED APPLICATIONS

This application is a 371 national stage of PCT International Application No. PCT/IB2010/001372 filed on May 5, 2010, and published in English on Sep. 16, 2010, as WO 2010/103408, which claims priority to European Application No. 09003416.6 filed on Mar. 9, 2009, the entire disclosure of which are incorporated herein by reference.

This invention relates to a novel pressure independent control valve.

Pressure independent control valves are known. Typically such valves are with a mechanism to enhance control of fluid flow independently of system pressure. Such valves may be employed with a differential pressure controller and are commonly used in heating ventilation and cooling systems.

Conventional pressure independent control valves comprise a globe valve incorporating a plug which is actuated by a linear actuator. Since the actuator typically is operated through a wall of the valve housing, it is usual for the plug to travel at an angle (typically 60 to 90 degrees) to the axis of the housing and direction of flow of fluid through the conduit into which the valve is installed.

In accordance with the present invention there is provided a control valve comprising; a wall defining a chamber, the chamber having an inlet end a middle portion and an outlet end in axial alignment, a valve seat and a valve plug proportioned to fit the valve seat arranged in axial alignment within the chamber and at least one of the valve seat and valve plug configured for axial movement towards the other, relative movement between the valve plug and valve seat being enabled by means of a cam mechanism comprising, a first shaft assembly extending axially along the chamber and fixed to one of the valve plug and valve seat, a cam operable with the first shaft assembly to separate or draw together the valve seat and valve plug along the axis of the chamber, a second shaft assembly coupled to the cam and extending through the middle portion of the chamber wall terminating in a free end, the free end being configured for attachment to a rotary actuator.

In use, rotary actuation of the second shaft assembly is translated, via the cam, to linear actuation of the first shaft assembly which in turn effects linear motion of the plug or seat axially of the chamber.

Preferably, the cam and shaft assembly arrangement is configured to be operable to move the valve seat towards the valve plug, the valve plug being fixed in position.

The assembly may further comprise a stroke limitation mechanism.

Desirably, the first and second shaft assemblies are arranged to be perpendicular to one another.

The pressure independent control valve can conveniently be used in combination with an inline differential pressure controller. In a preferred embodiment, the inline differential pressure controller sits downstream of the pressure independent control valve of the invention in line with the control valve and comprises a wall defining a chamber, the chamber having an inlet end and an outlet end in axial alignment; a valve seat and a valve plug proportioned to fit the valve seat arranged in axial alignment within the chamber and at least one of the valve seat and valve plug configured for axial movement towards the other when a pre-defined load from the inlet end is exceeded whereby to close the valve, resilient means for resisting the axial movement when the pre-defined load is not exceeded and a pilot valve integrated into the wall of the chamber and in fluid communication with the chamber by means of one or more conduits provided within the chamber wall.

The inline differential pressure controller may comprise various optional features as set out in the Applicant's co-pending patent application filed the same date as this patent application and repeated here.

A further objective is to provide a user friendly adjustment means involving a simple low torque setting of a pilot valve and ease of the pilot valve change over.

In a particular embodiment, the valve seat is operated by an annular diaphragm positioned proximal to the inlet end and carried on the annular valve seat which extends distally and is arranged for axial movement towards the outlet end; the resilient means is a coiled spring arranged for resisting said axial movement of the annular diaphragm and valve seat and the valve plug is fixedly mounted proximal to the outlet end and in axial alignment with the annular diaphragm and valve seat. The spring characteristics match the pre-defined load.

The pilot valve is of conventional construction. The walls of the main valve chamber are prepared to receive the pilot valve by providing a recess in the wall proportioned to receive the pilot valve and incorporating pressure signal conduits (or impulse pipes) to connect the pilot valve with the chamber of the main valve through drillings defining channels and conduits in the chamber wall. Conveniently, the recess and pilot valve body may be provided with complementing screw threads to allow easy and secure installation of the pilot valve whilst maintaining ease of removal or replacement of the pilot valve when repairing/maintaining the controller.

Various modifications to the design can be envisaged without departing from the invention. For example, the valve may be arranged for the plug to move towards the seat and resilient means other than a coil spring may be employed to balance the movement of the valve plug.

It will be appreciated that flow through a valve is dependent on the valve opening and differential pressures applied to the valve. Pressures in a hydronic system to which the invention is suitably applied can vary a lot and can cause control problems. In order to make the valve operation independent of pressure variation such that the flow depends only on the opening and closing of the control valve, it is necessary to keep the differential pressure across the control valve as constant as possible. This can be achieved by adding a differential pressure controller to the valve or rather into a common valve body as further described below.

The valves of the invention offer many advantages over conventional designs; the hydronic resistance of the inline valve geometry is relatively low compared with conventional globe valve geometry, as a consequence the inline valve of the invention can be made smaller. Smaller valve size provides benefits in manufacture in the form of lower material, storage and transport costs, benefits for the installer as the smaller valves are easier to manipulate during installation and benefits to the end-user as the valves take up less space when installed.

Other more technical advantages are that noise characteristics of the inline valve arrangement are better than conventionally used valve configurations, i.e they are more quite in operation. Furthermore, the cam operation of the valve seat has been found to produce high valve performance characteristics that can be further optimized by changing geometry of only one relatively simple part of the valve.

One embodiment of the invention will now be further described by way of example with reference to the following figures in which.

Figure 1:
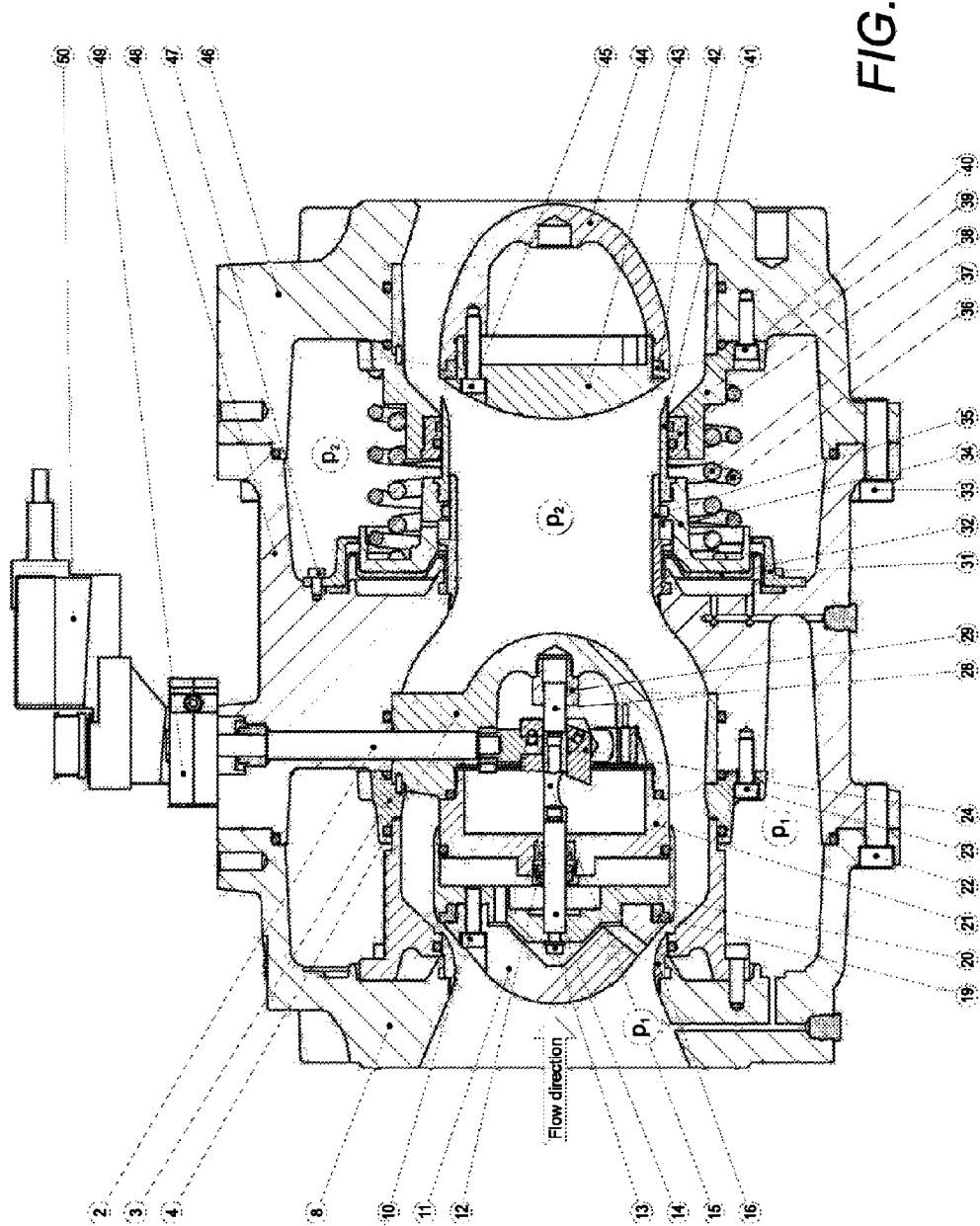
FIG. 1 shows an embodiment of a pressure independent control valve in accordance with the invention embodied in a single valve body which also includes a stroke limitation mechanism and differential pressure controller in line with the pressure independent control valve. The valve body is shown in cross section through a first axis.
Figure 2:
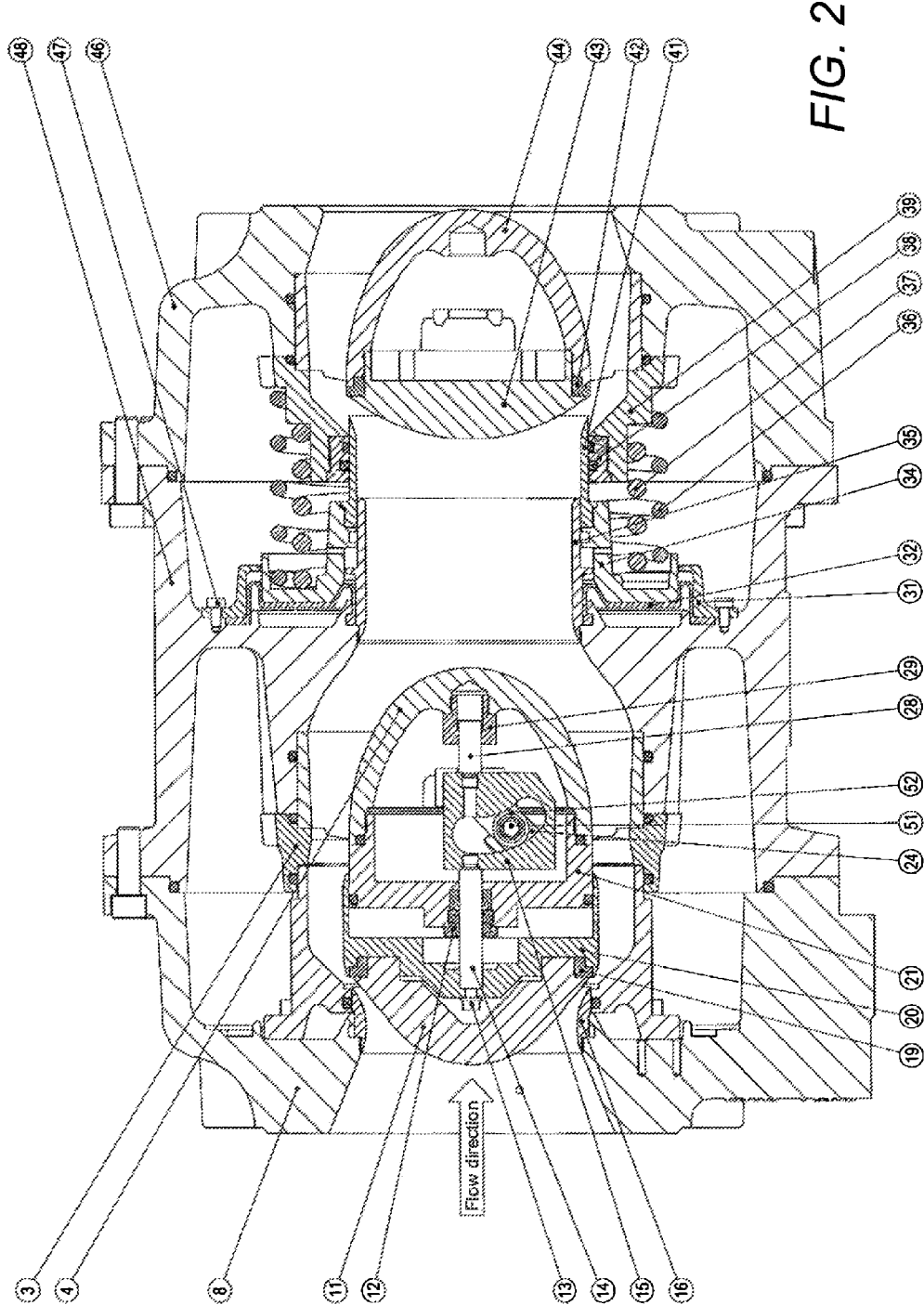
FIG. 2 shows the embodiment of FIG. 1 in cross section through a second axis of the valve body, through a plane perpendicular to the first axis.

As can be seen from the Figures, the valve body consists of a wall defining an inlet chamber (8), a middle chamber (48) and an outlet chamber (46), assembled together by number of fasteners (22, 33), for example screws or bolts, placed along flanges on all three chambers. The inlet and outlet chambers (8, 46) have blind holes with threads that are used for installing the valve between flanges on a target pipeline. Chambers provided in the valve body include various drillings to provide conduits that enable pressures to be transmitted to various points inside the valve chamber and for venting of chambers and installing pressure test points.

An inline control valve is installed between the inlet chamber (8) and the middle chamber (48). The inline control valve consists of a fixed control valve seat (16) fastened into the inlet chamber (8), and a valve plug, that consists of a control element (4), a fixed cover (21), a pressure relieved control cylinder (20), a seal (19), a cover (11) and a cam mechanism (described in more detail below). Control element (4) is held in place by a ring (3) that is fixed to the middle chamber by number of screws or other fasteners (23).

The cam mechanism consists of a first, inline shaft assembly (14, 15, 28), a cam (24), bearings (51, 52) and a second, perpendicular shaft (2). The inline shaft is sealed by the lip-seal (12) which prevents water from entering the control element (4). Movement of the inline shaft assembly (14, 15, 28) is guided by a guide (29) and a fixed cover (21). An end of the perpendicular shaft (2) protrudes outside the middle chamber wall (48), the end is shaped so that a rotational actuator (50) can be operably connected to it. Rotation of the actuator (50) in turn rotates the perpendicular shaft (2) and this motion is transferred, via the cam, into an inline displacement of inline shaft assembly (14, 15, 28). Since the control cylinder (20), cover (11) and inline shaft assembly (14, 15, 28) are fixed together by a number of screws (10, 13), they move together in an axial direction along the valve chamber opening and closing the gap between control valve seat (16) and cover (11) as required thereby controlling the flow of fluid through the control valve.

Between the actuator (50) and the perpendicular shaft (2) is shown an optional stroke limitation mechanism (49). By turning the adjustment screw one can limit the angle of actuator movement. This way also the stroke of the inline shaft assembly (14, 15, 28) is limited, and thus the opening of the control valve is limited.

Downstream of the control valve there is an inline differential pressure controller. Centred inside the outlet chamber (46) there is star shaped valve plug, which consists of a differential star (44), a seal (42) and a cover (43) assembled together by number of screws (45). The star is held in place by a ring (39) that is fixed to the outlet chamber by a number of screws (40)

Inside the middle chamber (48) there is a ring shaped diaphragm (32). The outer edge of the diaphragm (32) is fixed to the middle chamber by a diaphragm ring (31) and a plurality of screws (47), while the inner edge is fixed to the middle chamber by a funnel (35).

Between the middle chamber and outlet chamber there is a differential valve seat (41) that is screwed into a disc (34). Together, in use, they move in an inline (axial) direction under influence of differential pressure on the diaphragm and the force of springs (36, 37). Moving parts are guided by the funnel (35) and guide (38)

As shown in the Figures, pressure (p1) upstream of the control valve is transmitted through drilled channels in inlet chamber (8) and middle chamber (46) to the inlet side of the diaphragm (32) and acts in favour of dosing the valve. Pressure (p2) downstream of the control valve is transmitted through drilled channels in the disc (34) to the outlet side of the diaphragm (32) and together with the force of springs (36, 37) acts in favour of opening the valve. As long as the differential pressure (the difference of pressures p1–p2), multiplied by the active surface area of the diaphragm is equal to the spring force, the valve remains stationary. If the differential pressure increases, the differential pressure control valve closes (and vice versa). Thus the differential pressure across the control valve is kept almost constant.

The invention claimed is:

1. A pressure independent control valve system comprising a valve body housing a control valve in combination with an inline differential pressure controller, the system comprising:
   a pressure independent control valve comprising:
      a wall defining a chamber, the chamber having an inlet end, a middle portion and an outlet end in axial alignment, a valve seat and a valve plug proportioned to fit the valve seat arranged in axial alignment within the chamber and the valve seat and/or the valve plug configured for axial movement towards the other, relative movement between the valve plug and valve seat being enabled by a cam mechanism,
      the cam mechanism comprising,
         a first shaft assembly extending axially along the chamber and fixed to one of the valve plug and valve seat, a cam operable with the first shaft assembly to separate or draw together the valve seat and valve plug along the axis of the chamber, and
         a second shaft assembly coupled to the cam and extending through the middle portion of the chamber wall terminating in a free end, the free end being configured for attachment to a rotary actuator; and
      wherein a first pressure is located upstream of the control valve and a second pressure is located downstream of the control valve between the control valve and the inline differential pressure controller;
      the inline differential pressure controller sitting downstream of the pressure independent control valve in line with the control valve and the inline differential pressure controller comprising:
         a wall defining a chamber, the chamber having an inlet end and an outlet end in axial alignment;
         a valve seat and a valve plug proportioned to fit the valve seat arranged in axial alignment within the chamber and at least one of the valve seat and valve plug configured for axial movement towards the other when a pre-defined pressure difference between the first pressure and the second pressure is exceeded to close the valve; and
         resilient means for resisting the axial movement when the pre-defined pressure difference is not exceeded.

2. A control valve system as claimed in claim 1 wherein the cam and shaft assembly arrangement are configured to be operable to move the valve plug towards the valve seat, the valve seat being fixed in position.

3. A control valve system as claimed in claim 1 wherein the assembly further comprises a stroke limitation mechanism.

4. A control valve system as claimed in claim 1 wherein the first and second shaft assemblies are arranged to be perpendicular to one another.

5. A pressure independent control valve system as claimed in claim 1 wherein the valve seat is operated by an annular diaphragm positioned proximal to the inlet end and carried on the annular valve seat which extends distally and is arranged for axial movement towards the outlet end; the resilient means is a coiled spring arranged for resisting said axial movement of the annular diaphragm and valve seat and the valve plug is fixedly mounted proximal to the outlet end and in axial alignment with the annular diaphragm and valve seat and wherein the spring characteristics match the pre-defined load.

6. A pipe fitted with a pressure independent control valve as claimed in claim 1.

7. A hydronic system including a return pipe as claimed in claim 6.

8. A control valve system as claimed in claim 2 wherein the assembly further comprises a stroke limitation mechanism.

9. A control valve system as claimed in claim 2 wherein the first and second shaft assemblies are arranged to be perpendicular to one another.

10. A control valve system as claimed in claim 3 wherein the first and second shaft assemblies are arranged to be perpendicular to one another.

11. A pressure independent control valve system comprising a valve body housing a control valve in accordance with claim 3 in combination with an inline differential pressure controller.

12. A pressure independent control valve system comprising a valve body housing a control valve in accordance with claim 4 in combination with an inline differential pressure controller.

13. A pressure independent control valve system as claimed in claim 1 wherein the valve seat is operated by an annular diaphragm positioned proximal to the inlet end and carried on the annular valve seat which extends distally and is arranged for axial movement towards the outlet end; the resilient means is a coiled spring arranged for resisting said axial movement of the annular diaphragm and valve seat and the valve plug is fixedly mounted proximal to the outlet end and in axial alignment with the annular diaphragm and valve seat and wherein the spring characteristics match the pre-defined load.

14. A pipe fitted with a pressure independent control valve system as claimed in claim 5.

* * * * *